US009658046B2

(12) United States Patent
Fulton (10) Patent No.: US 9,658,046 B2
(45) Date of Patent: May 23, 2017

(54) MARKING IMPLEMENT FOR MEASURING APPARATUS

(71) Applicant: Adam S Fulton, Bellingham, WA (US)

(72) Inventor: Adam S Fulton, Bellingham, WA (US)

( * ) Notice: Subject to any disclaimer, the term of this patent is extended or adjusted under 35 U.S.C. 154(b) by 99 days.

(21) Appl. No.: 14/528,824

(22) Filed: Oct. 30, 2014

(65) Prior Publication Data

US 2015/0113821 A1    Apr. 30, 2015

Related U.S. Application Data

(60) Provisional application No. 61/898,136, filed on Oct. 31, 2013.

(51) Int. Cl.
*G01B 3/10* (2006.01)

(52) U.S. Cl.
CPC .... *G01B 3/1084* (2013.01); *G01B 2003/1089* (2013.01)

(58) Field of Classification Search
CPC .......... G01B 2003/1089; G01B 3/1084; G01B 3/1056; G01B 3/1082; G01B 3/1005; G01B 2003/1094; G01B 3/1041; G01B 3/1061
USPC .......................................................... 33/770
See application file for complete search history.

(56) References Cited

U.S. PATENT DOCUMENTS

| | | | |
|---|---|---|---|
| 2,581,858 A | 6/1947 | Hilt et al. | |
| 2,651,843 A | 9/1953 | Goodford | |
| 2,893,122 A | 7/1959 | Greco | |
| 3,526,964 A | 9/1970 | Clark, Jr. | |
| 4,103,426 A | 8/1978 | Robin | |
| 4,667,412 A | 5/1987 | Carlson | |
| 4,999,924 A * | 3/1991 | Shields | G01B 3/1071 33/668 |
| 5,699,622 A | 12/1997 | Umbro | |
| 6,637,125 B2 | 10/2003 | Scarborough | |
| 6,725,560 B2 | 4/2004 | Smith | |
| D553,028 S * | 10/2007 | Sumner | D10/74 |
| 7,490,415 B1 * | 2/2009 | Cubbedge | G01B 3/1071 33/770 |
| 7,823,294 B2 | 11/2010 | Contreras | |
| 7,900,370 B1 * | 3/2011 | Treige | G01B 3/1061 33/770 |
| 8,225,520 B2 | 7/2012 | Rabin | |
| 8,522,447 B1 * | 9/2013 | Novotny | G01C 15/105 33/485 |
| 8,832,958 B2 * | 9/2014 | Mabey | G01B 3/1005 33/758 |
| 2003/0182811 A1 | 10/2003 | Hairapetian | |
| 2004/0025364 A1 * | 2/2004 | Elder | G01B 3/1071 33/770 |
| 2006/0112583 A1 * | 6/2006 | Sullivan | G01B 3/1061 33/770 |

(Continued)

*Primary Examiner* — Yaritza Guadalupe-McCall
(74) *Attorney, Agent, or Firm* — Schacht Law Office, Inc.; Dwayne Rogge (57) ABSTRACT

A marking implement for a measuring apparatus in one example has a measuring extension with an upper surface with markings thereon and a lower surface. The marking implement in one example includes an upper clamp portion and a lower clamp portion having: a marking implement receiving device on the lower surface of the lower clamp. The marking implement in one example also has a hinge comprising the first hinge portion and second hinge portion and a clasp allowing for selective control of rotational movement of the hinge.

5 Claims, 5 Drawing Sheets

(56) References Cited

U.S. PATENT DOCUMENTS

| | | | | |
|---|---|---|---|---|
| 2006/0288599 A1* | 12/2006 | Hajianpour | ............... | G01B 3/10 33/755 |
| 2008/0098610 A1* | 5/2008 | Lipps | .................... | G01B 3/1084 33/770 |
| 2012/0073155 A1* | 3/2012 | Mabey | ................. | G01B 3/1005 33/770 |
| 2013/0255093 A1* | 10/2013 | Carrier | ................. | G01B 3/1056 33/770 |
| 2014/0317943 A1* | 10/2014 | DeMartinis | .......... | G01B 3/1084 33/668 |
| 2015/0113821 A1* | 4/2015 | Fulton | ................. | G01B 3/1084 33/767 |
| 2015/0233691 A1* | 8/2015 | Higginbotham | ..... | G01B 3/1061 33/760 |

\* cited by examiner

MARKING IMPLEMENT FOR MEASURING APPARATUS

RELATED APPLICATIONS

This application claims priority benefit of U.S. Ser. No. 61/898,136, filed Oct. 31, 2013, incorporated herein by reference.

BACKGROUND OF THE DISCLOSURE

Field of the Disclosure

This application relates to the field of removable marking tools to be temporarily attached to a tape measure device for the marking of construction materials.

BRIEF SUMMARY OF THE DISCLOSURE

Disclosed herein is a marking implement to be removably attached to a measuring apparatus. The measuring apparatus having: a housing, a retracting and coiling measuring tape having an upper surface with markings thereon and a lower surface, a tape locking mechanism. In one example the marking implement comprises an upper clamp portion comprising: a vertically upper surface facing away from the measuring tape; a vertically lower surface in contact with the upper surface of the measuring tape; a first hinge portion one lateral side of the upper clamp portion; and a first latch portion. In one example the marking implement comprises a lower clamp portion comprising: a vertically upper surface in contact with the lower surface of the measuring tape; a vertically lower surface facing away from the measuring tape; a marking implement receiving device on the lower surface of the lower clamp; a second hinge portion on one lateral side; a second latch portion; a hinge comprising the first hinge portion and second hinge portion providing rotational movement between the first hinge portion and the second hinge portion. In one example the marking implement comprises a clasp comprising the first latch portion and second latch portion allowing for selective control of rotational movement between the first hinge portion and the second hinge portion.

The marking implement as recited above may be arranged wherein the clasp is on the lateral side of the marking implement opposing the hinge.

The clasp may comprise a frame attached by way of a living hinge to the upper or lower member which fits about and provides a snap-fit to a detent on the opposing member.

The marking implement as recited above may be arranged wherein the upper clamp portion comprises at least one position indicator in vertical alignment with the marking implement receiving device.

The marking implement as recited above further comprises a writing lead which when viewed in cross-section is substantially cylindrical, square, rectangular; or other shapes. The lead held within the marking implement receiving device.

The marking implement as recited above may be arranged wherein: the vertically lower surface in contact with the upper surface of the measuring tape is convex; and the vertically upper surface in contact with the lower surface of the measuring tape is concave.

The marking implement as recited above may be arranged wherein the hinge is substantially identical to the clasp.

DETAILED DESCRIPTION OF THE DISCLOSURE

Disclosed herein is a marking implement which is configured for removable and positionable attachment to a measuring tape. Such measuring tapes include metal band tapes common to construction and woodworking, cloth measuring tape common to sewing, rulers, framing squares, drywall squares and other equivalent apparatuses. The marking implement is used to aid in repeated and accurate marking of items. The apparatus applicable to construction, flooring, drywall, sewing, furniture making, trades as well as other applications where such measuring devices are utilized. One example of a measuring tape uses for sewing is disclosed in U.S. patent Ser. No. 372,202. One example of a drywall square is disclosed in Published U.S. patent application Ser. No. 13/176,995. One example of a framing square is shown in U.S. Pat. No. 7,958,645. One example of a ruler is shown in US Design Pat. No. 340,195. Each of these examples is incorporated herein by reference as disclosing examples of measuring devices (tapes) to which the disclosed marking implement may be attached.

Figure 1:
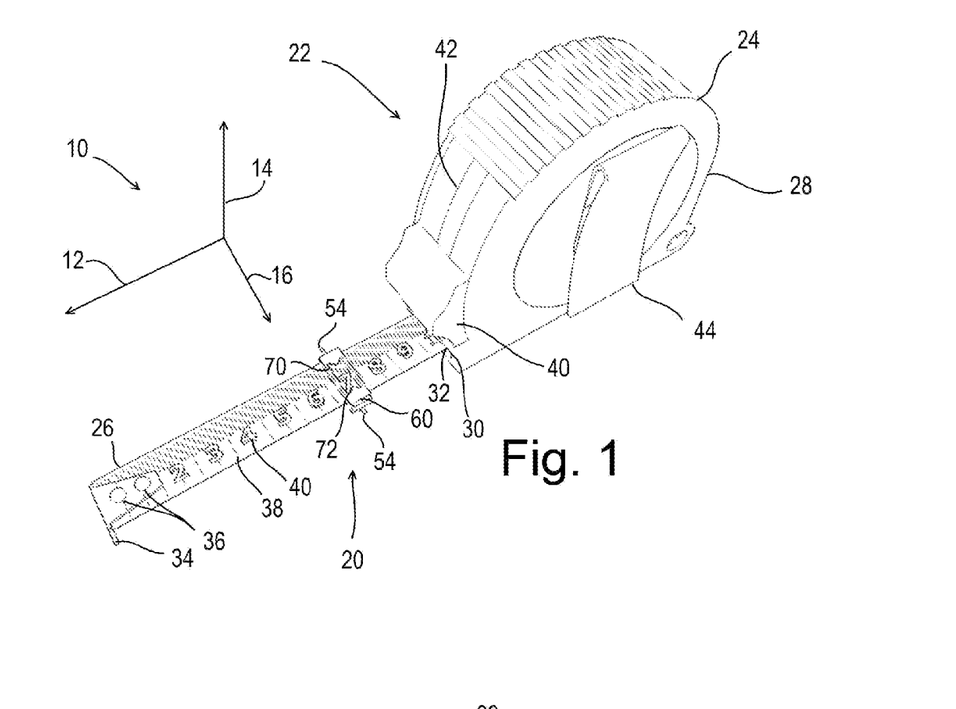
FIG. 1 is a top isometric view of one example of the disclosed apparatus.

Tape measures 22 as shown by example in FIG. 1 are well-known in the art and generally comprise a housing 24, commonly with a coil spring therein so as to facilitate retraction of the measuring tape 26 back into the housing 24 after it has been extracted and used. Such retraction protects the measuring tape when in use as well as reduces the storage and transportation size of the apparatus. The housing 24 having a rear end 28 as well as a front end 30 with an opening 32 provided at the front end 30 through which the measuring tape 26 extends for use. The measuring tape 26 commonly has a tang 34 attached thereto by way of a plurality of rivets 36 or studs or other source of mechanical fasteners. The tang 34 is usually loosely attached to the measuring tape 26 to allow for longitudinal movement along the measuring tape 26 equivalent to the longitudinal thickness of the tang 34. This longitudinal movement may be permitted by way of the holes through which the rivets pass being oblong having a length dimension equal to the diameter of the rivet post plus the width of the tang. In this way, inside and outside measurements can be taken with the measuring tape 26 without being offset by the longitudinal thickness of the tang 34. Such measuring tapes 26 commonly have markings 38 and a numbering system 40 commonly in the English and/or metric systems so as to indicate to the user the length from the tang 34 to the desired location on the measuring tape 26.

Such tape measures 22 generally also include a tape lock 40 which in this example can be repositioned vertically along channel 42 so as to selectively engage or disengage a locking mechanism controlling retraction and extraction of the measuring tape 26. In addition, a belt clip 44 may be utilized for attachment of the tape measure 22 to a belt or other piece of clothing etc.

To aid in description of the disclosed apparatus and methods for using the apparatus, and axes system 10 is utilized comprising a longitudinal axis 12 generally aligned with the longitudinal axis of the measuring tape 26 when in an extended position as shown in FIG. 1. The axes system also including a lateral axis 16 perpendicular to the longitudinal axis 12 and parallel to the markings 38. The axes system also includes a vertical axis 14 perpendicular to both the longitudinal axis 12 and the lateral axis 16. It is indented that the vertical axis 14 is defined as described above and is not intended to indicate a particular orientation of the apparatus in use as the apparatus is functional in any orientation. This axes system is included to aid in description of the apparatus, and not intended to limit the claimed apparatus nor method to a particular orientation beyond the scope of the claims.

As it is often required in use for the user to utilize both hands in properly positioning of the tape measure, it is commonly difficult to hold a marking implement while holding the tape measure 22 in the proper position. Thus, several marking implement holders have been disclosed such as the apparatus disclosed in U.S. Pat. No. 2,893,122 wherein a marking apparatus such as a pencil (18) is attached to the housing (10) such that repositioning of the tape measure housing moves the pencil (18) to the desired position. Wherein a tape lock is included with the tape measure, the tape lock may be set at this point. The challenge being in such a device that accurate repositioning of the housing is commonly significantly difficult.

Figure 2:
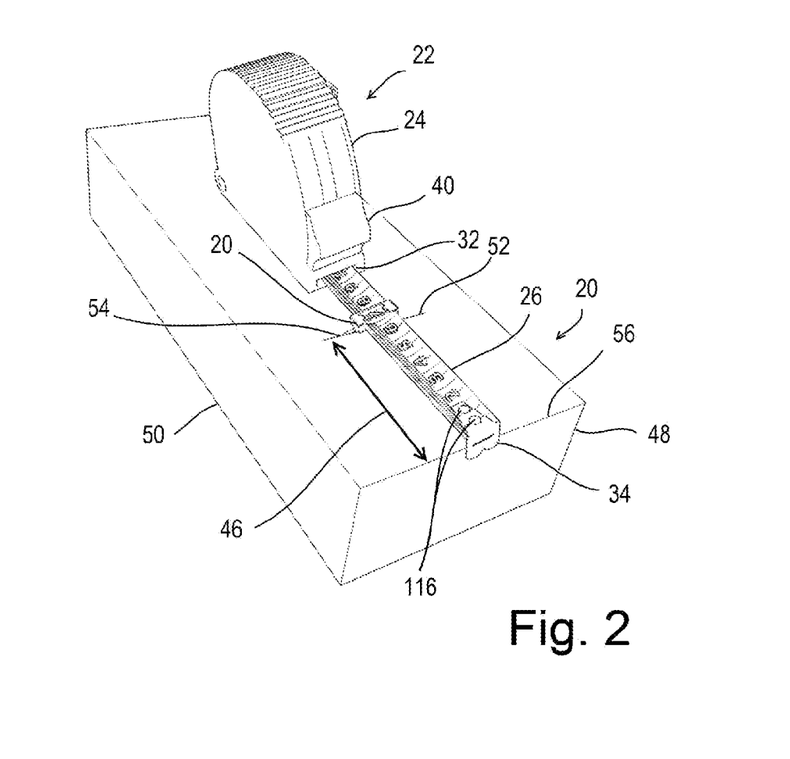
FIG. 2 is a top isometric view of one example of the disclosed apparatus in use.

Looking to FIG. 2, the marking implement 20 is shown mounted to the measuring tape 26 at about the "7" marking. As shown, the apparatus is being used to mark the distance 46 from the end 48 of a board 50 to a line 52 being scribed by a marking portion of the marking implement 20. The board 50 is used as an example as other items could be measured and marked such as fabric, paper, drywall, plywood, glass, polymers, etc. The marking portion 54 in this example being provided by a substantially cylindrical lead attached to the main body of the marking implement 20. The marking portion 54a shown in FIGS. 7-9 comprises a flat bar lead or scoring blade. In this example, the tang 34 is held against an upper edge 56 of the board 50 and then moved slightly radially relative thereto to produce the line 52 at the desired distance 46.

Figure 3:
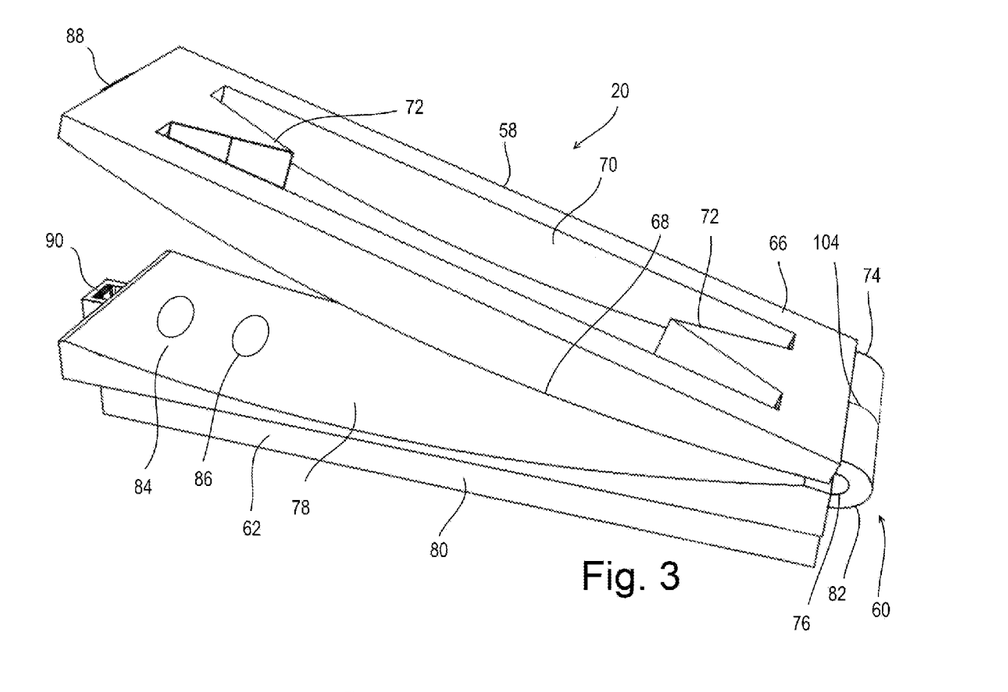
FIG. 3 is a front isometric enlarged view of one example of the disclosed apparatus in an open position.

Looking to FIG. 3, the marking implement 20 can be seen in a partially open position. In this Fig., as well as FIG. 4, the marking implement 20 has been removed from the tape measure 22 to show the components more clearly. In FIG. 3, it can be seen how the marking implement 20 includes an upper clamp portion 58 which is connected by way of a hinge 60 to a lower clamp portion 62. A clasp 64 (FIG. 4) is used to hold the apparatus with compressive force about the measuring tape 26 at the desired longitudinal position.

FIG. 3 shows an example wherein the upper clamp portion 58 comprises a vertically upper surface 66 and an opposing vertically lower surface 68. In the example shown, the vertically lower surface 68 is convex to conform to the concave upper surface of the measuring tape 26. Measuring tapes 26 commonly are arcuate in this way so as to provide rigidity when not coiled within the housing 24. In this example, the upper clamp portion 58 has a surface defining an opening 70 there-through to allow viewing of the numbers 40 and markings 38 previously described. To ensure proper alignment of the marking portion 54 with the markings 38, at least one position indicator 72 may be provided on the upper clamp portion 58. As the upper clamp portion 58 shown in this example comprises a central opening 70, the position indicators 72 comprise arrow-like protrusions pointing laterally inward as can be more easily seen in FIG. 1. In other examples, the position indicator 72 may not be on the longitudinal center of the main body but may be on either longitudinal side. In either case it will be desired to indicate to the user a position in vertical opposition to the marking portion 54.

To facilitate attachment and removal from the measuring tape 26, the upper clamp portion 58 in this example comprises a first hinge portion 74 which may be attached to or formed (cast) as a unitary structure with the upper clamp portion 58. The first hinge portion 74 in this example forms one half of a half-barrel hinge with a surface defining a pin receiver therein to receive a hinge pin 76.

The lower clamp portion 62 of the main body in this example comprises a vertically upper surface 78, and a vertically lower surface 80. In this example the vertically upper surface 78 is concave so as to conform to the lower surface of the measuring tape 26 which may be concave again to facilitate rigidity in the extended position. A second hinge portion 82 may be attached to or formed (cast) as a unitary structure with the lower clamp portion 62. The second hinge portion 82 forming the second half of the half-barrel hinge described above in contact with the first hinge portion 74 at location 104. In one form a protrusion of the upper and/or lower hinge portions forms the hinge pin 76. In other examples, a separate hinge pin 76 may be utilized.

In operation, the marking implement 20 is placed about the measuring tape 26 and then repositioned longitudinally such that the position indicators 72 align with the markings 38 and or numbers 40 to the desired length of the object to be marked. The marking implement 20 is then closed about the hinge 60 so as to substantially prohibit further movement relative to the measuring tape 26. In one form, sufficient friction is provided by way of the hinge 60 while in other examples the clasp 64 may be utilized to fixedly hold the marking implement 20 onto the measuring tape 26.

Figure 6:
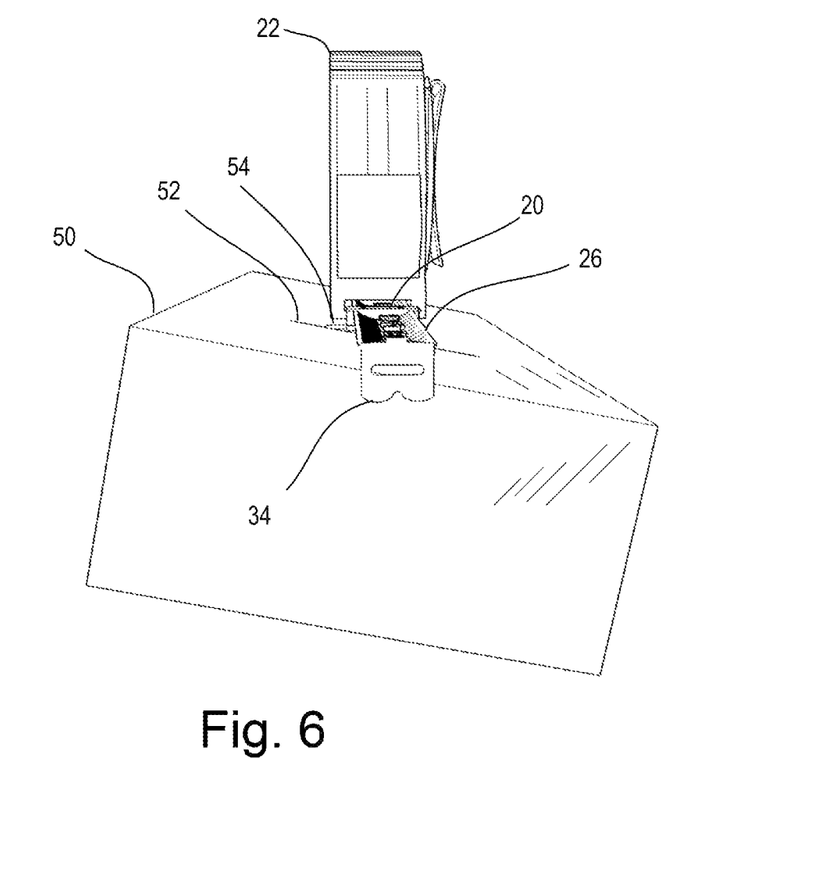
FIG. 6 is a front isometric view of the device in use.

In the example shown in FIG. 6, it may be desired to hold the apparatus at an angle about the longitudinal axis to facilitate marking the line 52.

In the example shown in FIG. 3, the clasp 64 comprises a first latch portion 88 attached to or formed as a unitary structure with the upper clamp portion 58. Also shown in this example is a second latch portion 90 attached to or formed as a unitary structure with the lower clamp portion 62. In such latches, it is common for a portion of the clasp to deform or reposition past a protrusion in the opposing portion and then be fitted into a detent in the opposing portion. Other clasp arrangements and structures may be used.

In one form, the vertically lower convex surface 68 and/or the vertically upper concave surface 78 may comprise a textured surface 84 and/or a deformable material 86 such as a thin layer of rubber, silicone, etc. Either the textured surface 84 and/or deformable material 86 may facilitate positioning without undesired movement of the marking implement 20 relative to the measuring tape 26. The apparatus may be then moved laterally and or rotationally in an arc centered upon the tang 34 so as to leave a mark or line 52 at a specified distance from the tang 34.

Figure 4:
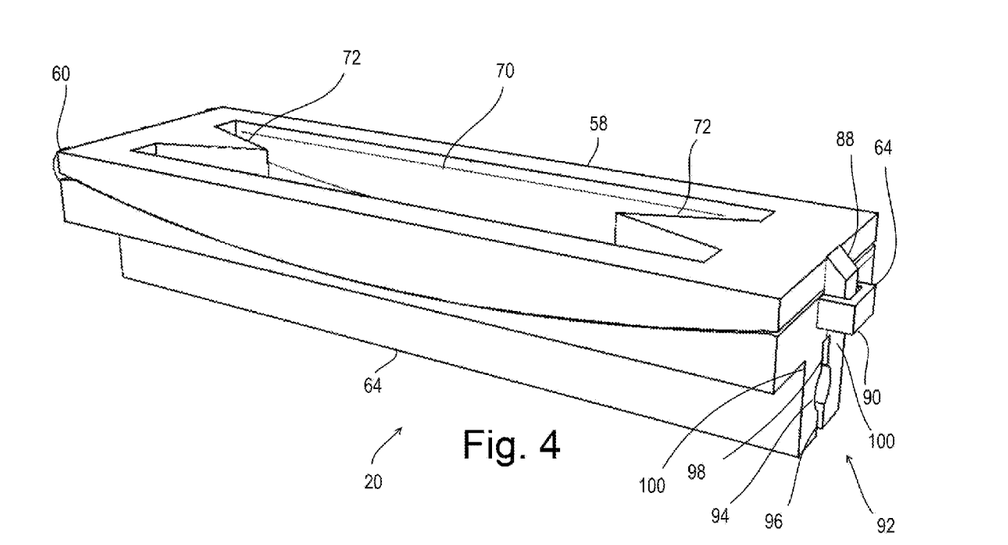
FIG. 4 is a front isometric enlarged view of one example of the disclosed apparatus in a closed position.

FIG. 4 also shows one example of a marking implement receiving device 92. The marking implement receiving device 92 configured to hold a marking implement such as the substantially cylindrical lead 54 shown in FIG. 5, the flat bar 54*a* shown in FIG. 9, or similar and equivalent apparatus for marking and/or scoring. The term lead used herein does not necessarily indicate a specific material. The term lead is well-known in the art to indicate a Plumbum or graphite material. The term lead is used herein to indicate these materials as well as equivalents used in the arts of school and office supplies. The marking device may be made of other materials, such as felt used as an ink-impregnated marker, chalk, a metal material for scoring such as in drywall use, lead, wax, and many other equivalent marking and/or scoring materials. For example, mechanical pencils use a very similar if not identical cylindrical lead 54 which are commonly found in many diameters and lengths.

The marking implement receiving device 92 in this example comprises a central portion 94 which is shown as generally cylindrical in cross-section. The central portion 94 in one example has a diameter fractionally smaller than the outer diameter of the lead to be placed in the receiving device 92. To allow the slightly larger lead to fit into the central portion 94, in this example grooves 96 and 98 are formed in the lower and upper portions of the lower clamp portion 64. As the sides of the groove 96 are deform outwards, the lower portion in one example deforms or opens generally at the region 100 and then repositions inward to "clamp" about the lead 54 or 54*a*.

Figure 5:
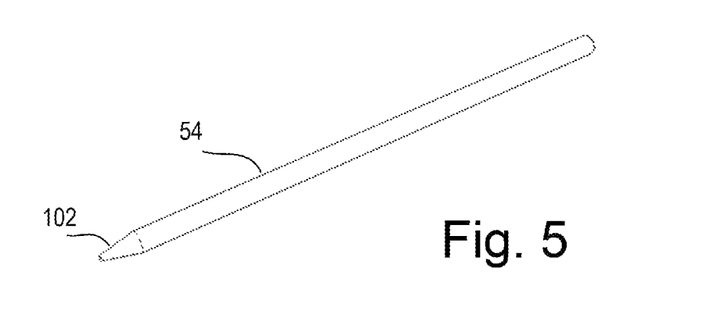
FIG. 5 is an isometric view of one example of a marking implement used with the disclosed apparatus.

In FIG. 5 the lead 54 is shown with a tapered or sharpened end 102 which may be used to mark a finer line than the un-tapered lead may allow.

Figure 7:
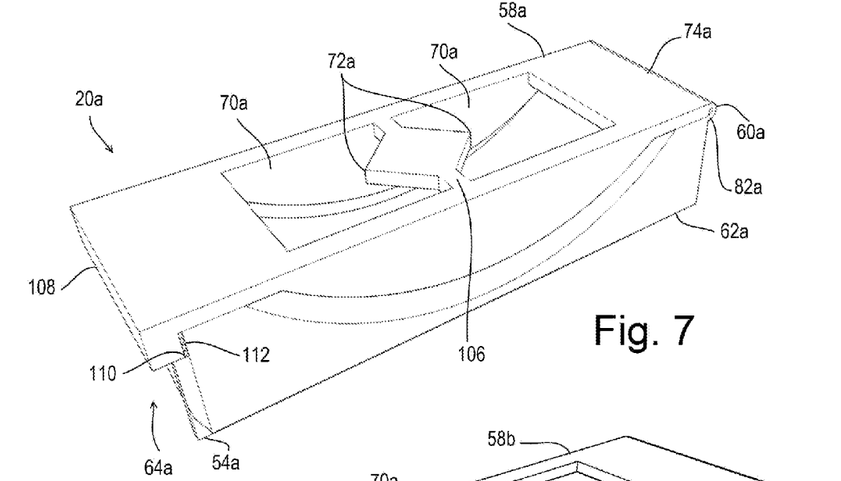
FIG. 7 is a front isometric view of one example of the disclosed apparatus.

In the example shown in FIG. 7 components and surfaces having similar function to that shown in the previous example are labeled with an "a" suffix. For example, the marking device 54 shown in FIG. 1 is functionally similar to the marking device 54*a* shown in FIG. 7. It is to be understood that many components shown in the example of FIG. 7 may be interchanged with the examples shown in the other Figs.

In the example shown in FIG. 7, the position indicators 72*a* are attached to a central strut 106 and are pointed laterally outwards therefrom. When some examples of the marking implement are attached to some measuring devices, such the example shown in FIG. 3 for example, may occlude viewing of the numerals 40 and/or markings 38. Thus, by providing this example it may be easier to read such numbers 40 and or markings 38.

FIG. 7 also shows a modification to the hinge in that the hinge 60*a* of this example comprises a living hinge. A living hinge is a thin flexible hinge (flexure bearing) made from the same material as the two rigid pieces it connects, rather than a cloth, leather, or some other flexible substance or traditional two part rotational hinge. A living hinge is typically thinned or cut two allow the rigid pieces to bend along the line of the hinge. The minimal friction and very little wear in such a living hinge makes it useful in many applications. In this example, the living hinge 60*a* allows the upper clamp portion 58*a*, lower clamp portion 62*a*, and living hinge 60*a* to be produced as a unitary component in a single casting step. In this example, the first hinge portion 74*a* attached to the upper clamp portion 58*a* and second hinge portion 82*a* attached to the lower clamp portion 62*a* are laterally adjacent, rather than longitudinally adjacent as shown in the example of FIG. 3.

FIG. 7 also shows modification to the clasp. The clasp 64*a* comprises a lateral protrusion 108 of the upper clamp portion 58*a* beyond the lateral edge of the lower clamp portion 62*a*. Fitted on the inner edge of the protrusion 108 in one example is a detent 110 or slight protrusion. The detent 110 engages an indent in the lower clamp portion 62*a* to latch thereto and provide clamping force about the measuring device. In this example, the indent in the loop lower clamp portion 62*a* comprises a sawtooth surface 112 consisting of a plurality of substantially parallel detents and indents to provide a ratcheting type clasp 64*a*.

In one example, the clasp 64 shown in FIGS. 3 and 4 may be longitudinally extended wider than that shown in FIG. 4.

In one example, the hinge 60 may not be used but may be replaced by a second clasp 64, clasps 64*a*, or equivalents. In such an example, the upper clamp portion may not pivotally connect to the lower clamp portion. When the components are properly aligned with the measuring implement, the upper and lower components are vertically repositioned (pressed) together such that the clasps on both ends of the marking implement engage and frictionally connect the marking implement to the measuring device.

Or other example, the hinges 74 may be provided on each lateral side of the marking implement 20 in any of the examples and the clasp 64 may then be provided at some position on the upper clamp portion 58 or on the lower clamp portion 62 between the two hinges 74.

Figure 8:
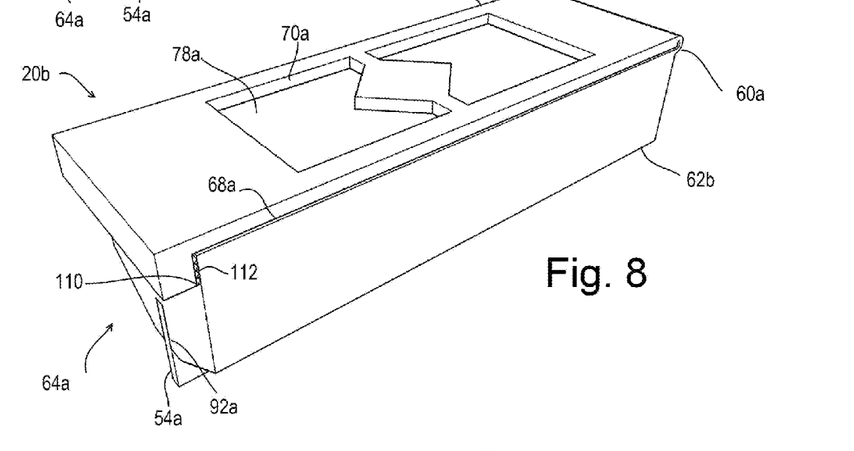
FIG. 8 is a front isometric view of one example of the disclosed apparatus.
Figure 9:
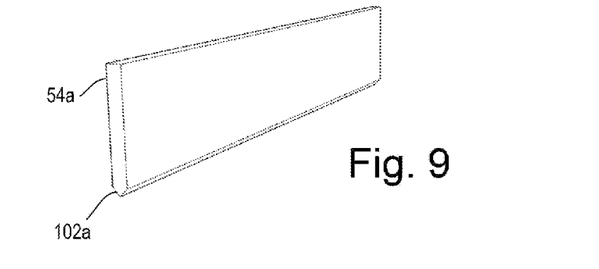
FIG. 9 is an isometric view of one example of a marking implement used with the disclosed apparatus.

The examples shown in FIGS. 3-7 are advantageously configured to engage a convex/concave apparatuses such as a tape measure or non-rigid measuring apparatuses such as a cloth measuring tape used for sewing. Where a rigid or flat bar measuring device such as a drywall square, framing square, ruler, etc. is utilized, it may be desired that the marking implement 20*b* be produced as shown in FIG. 8. In this example components and surfaces having similar function to those shown in the previous examples are labeled with an "a" suffix. For example, the vertically lower surface 68 shown in FIG. 1 is functionally similar to the vertically lower surface 68 shown in FIG. 8 but is different in shape to be used with non-concave measuring devices. The vertically lower surface 68*a* and vertically upper surface 78*a* shown in FIG. 8 are substantially planar and may have a slight gap there between. In use, the apparatus functions the same as the previous samples but is more adapted to flat bar measuring devices and other applications.

In the example shown in FIG. 8, the marking implement receiving device 92*a* may comprise micro-detents or other surfaces to engage the marking portion 54*a*.

Figures 10, 11:
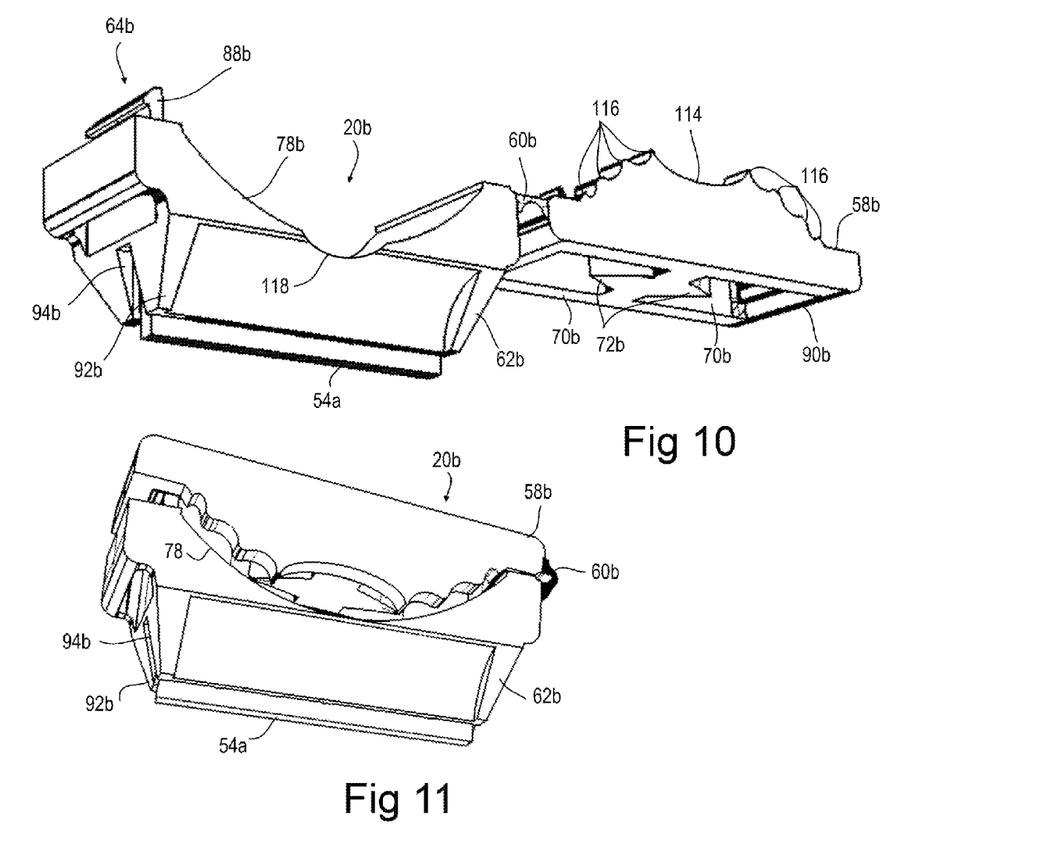
FIG. 10 is a bottom isometric view of one example of the disclosed apparatus in an opened position.
FIG. 11 is a bottom isometric view of one example of the disclosed apparatus in a closed position.

Looking to FIG. 10 is shown another example with similar components to those shown in the previous examples. In the example shown in FIGS. 10-11, components and surfaces having similar function to those shown in the previous examples are labeled with a "b" suffix. For example, the marking implement 20 shown in FIG. 1 is functionally similar to the marking implement 20*b* shown in FIGS. 10-11. In this example, the first latch portion 88*b* is attached to the lower clamp portion 62*b* and the second latch portion 90*b* which is opposed to that as shown in FIG. 3. The hinge 60*b* is shown as a living hinge similar to that shown in FIG. 7. Likewise, the lead 54*a* is the same lead shown in FIGS. 8-9.

In this example, the upper clamp portion 58b includes a concave rivet clearance surface 114. This surface 114 allows the marking implement 20b to slide past the rivets 116 and upper surface of the tang 34.

In addition, the upper clamp portion comprises a plurality of contact points 116 which contact and frictionally engage the upper surface of the measuring tape 26 so as to prohibit longitudinal movement of the marking implement 20b relative to the measuring tape 26. These contact points 116 have also been found advantageous when utilizing measuring tapes having different lateral widths, different vertical thicknesses, or difference arcs.

In one example, the lower clamp portion 62b also comprises a rivet clearance surface 118 detected from the concave surface 78b similar to that of the rivet clearance surface 114. This rivet clearance surface 118 will clear the lower end of the rivets 116 shown in FIG. 2.

While the components disclosed herein may be made of polymers, metals, natural materials or composites, clamping portions made of cast, printed, or machined polyethylene have shown to have good resilience, durability, and flexibility.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A marking implement for a measuring apparatus having a housing, a retracting and coiling measuring tape having an upper surface with markings thereon and a lower surface, a tape locking mechanism; where the marking implement comprises:
   a. an upper clamp portion comprising:
      i. a vertically upper surface facing away from the measuring tape;
      ii. a vertically lower surface in contact with the upper surface of the measuring tape;
      iii. a first hinge portion one lateral side of the upper clamp portion;
      iv. a first latch portion laterally opposing the first hinge portion;
   b. a lower clamp portion comprising:
      i. a vertically upper surface in contact with the lower surface of the measuring tape;
      ii. a vertically lower surface facing away from the measuring tape;
      iii. a marking implement receiving device on the lower surface of the lower clamp;
      iv. wherein the marking implement extends laterally across the width of the measuring tape;
      v. wherein the marking implement is substantially longer laterally than longitudinally;
      vi. wherein the upper clamp portion comprises at least one position indicator in vertical alignment with the marking implement receiving device;
      vii. a second hinge portion on one lateral side;
      viii. a second latch portion laterally opposing the second hinge portion;
   c. a hinge comprising the first hinge portion and second hinge portion providing rotational movement between the first hinge portion and the second hinge portion; and
   d. a clasp comprising the first latch portion and second latch portion allowing for selective control of rotational movement between the first hinge portion and the second hinge portion.

2. The marking implement as recited in claim 1 wherein the clasp is on the lateral side of the marking implement opposing the hinge.

3. The marking implement as recited in claim 1 further comprising a lead held within the marking implement receiving device.

4. The marking implement as recited in claim 1 wherein:
   a. the vertically lower surface in contact with the upper surface of the measuring tape is convex; and
   b. a vertically upper surface in contact with the lower surface of the measuring tape is concave.

5. A marking implement for a measuring apparatus having: a measuring extension having an upper surface with markings thereon and a lower surface; wherein the marking implement comprises:
   a. an upper clamp portion comprising:
      i. a vertically upper surface facing away from the markings upon the measuring extension;
      ii. a vertically lower surface in contact with the upper surface of the measuring extension;
      iii. a first hinge portion one lateral side of the upper clamp portion;
      iv. a first latch portion;
   b. a lower clamp portion comprising:
      i. a vertically upper surface in contact with the lower surface of the measuring extension;
      ii. a vertically lower surface facing away from the measuring extension;
      iii. a marking implement receiving device on the lower surface of the lower clamp;
      iv. wherein the marking implement extends laterally across the width of the measuring tape;
      v. wherein the marking implement is substantially longer laterally than longitudinally;
      vi. wherein the upper clamp portion comprises at least one position indicator in vertical alignment with the marking implement receiving device;
      vii. a second hinge portion on one lateral side;
      viii. a second latch portion;
   c. a hinge comprising the first hinge portion and second hinge portion providing rotational movement between the first hinge portion and the second hinge portion; and
   d. a clasp comprising the first latch portion and second latch portion allowing for selective control of rotational movement between the first hinge portion and the second hinge portion.

* * * * *